United States Patent [19]

Kaiwa et al.

[11] Patent Number: 4,881,258
[45] Date of Patent: Nov. 14, 1989

[54] PORTABLE TYPE MOBILE RADIO TELEPHONE

[75] Inventors: Ryoichi Kaiwa; Michiyoshi Kudo; Keiki Kobayashi, all of Yokohama, Japan; Yuichiro Suganuma, Schaumburg, Ill.; Naotomo Adachi, Yokohama, Japan

[73] Assignee: Matsushita Electric Industrial Co., Ltd., Osaka, Japan

[21] Appl. No.: 87,038

[22] Filed: Aug. 19, 1987

[30] Foreign Application Priority Data

| Aug. 20, 1986 | [JP] | Japan | 61-194301 |
| Aug. 20, 1986 | [JP] | Japan | 61-194302 |
| Aug. 20, 1986 | [JP] | Japan | 61-194303 |
| Aug. 21, 1986 | [JP] | Japan | 61-196163 |

[51] Int. Cl.$^4$ .......................................... H04M 1/02
[52] U.S. Cl. .................................... 379/58; 379/428; 379/440; 455/90; D14/138
[58] Field of Search ............. 379/58, 59, 61-63, 379/110, 419, 428, 432-440, 445; 455/89, 90, 346, 349, 351; D14/56, 53, 52, 62, 64, 58, 138; 248/207

[56] References Cited

U.S. PATENT DOCUMENTS

| D. 263,703 | 4/1982 | Fukushima et al. | D14/53 |
| D. 263,706 | 4/1982 | Fukushima et al. | D14/53 |
| 3,322,385 | 5/1967 | Larrabee | 248/207 |
| 4,117,276 | 9/1978 | Zurawski | 379/437 |
| 4,284,855 | 8/1981 | Adams et al. | 379/435 |
| 4,677,654 | 6/1987 | Lagin et al. | 379/58 |
| 4,713,836 | 12/1987 | Suzuki | 379/58 |

FOREIGN PATENT DOCUMENTS 1494665 12/1977 United Kingdom .

OTHER PUBLICATIONS

Portable Cellular Phone, Radio Shack, 1986 Catalog, Received Sep. 4, 1985, p. 77.

Primary Examiner—Jin F. Ng
Assistant Examiner—Randall S. Vaas
Attorney, Agent, or Firm—Lowe, Price, LeBlanc, Becker & Shur

[57] ABSTRACT

A portable type mobile radio telephone wherein a battery holding device and a handset cradle is formed on one wider surface of the flat-shaped transceiver unit to be in parallel to each other. The transceiver unit has a guide hole and a first connector at a narrower surface thereof, and a base plate is attached to the battery holding device and the cradle so as to be interposed between the battery holding device and the transceiver unit, and the base plate has a curved portion at one end portion thereof such that the curved portion faces one narrower surface of the transceiver unit. The curved portion is provided with a guide pin and a second connector so that the first and second connectors are guided by connection of the guide pin and the guide hole and coupled with each other when the base plate is moved in a parallel direction with respect to the wider surface of the transceiver unit. The transceiver unit has an engaging projection on the wider surface thereof and the base plate has an engaging hole which is positioned to face the engaging projection when the first and second connectors are coupled with each other. The transceiver unit and the base plate are connected to each other by engagement of the engaging hole and the engaging projection.

9 Claims, 17 Drawing Sheets

PORTABLE TYPE MOBILE RADIO TELEPHONE

BACKGROUND OF THE INVENTION

The present invention relates generally to portable type mobile radio telephones which can be used additionally in buildings, boats and so on.

Conventionally proposed mobile radio telephones are of the vertically piled-up type in which a rectangular battery and a transceiver unit are piled up each other and a cradle is installed on the transceiver unit to hold a handset and of the vertical combination type in which a flat battery and a transceiver unit are arranged lengthwise and horizontally put together with each other and a handset is vertically held on a cradle mounted on the transceiver unit.

In the above-mentioned arrangements of mobile radio telephones, because of the vertically installation, the stability is lowered when it is put on floor, seat, table of a motor vehicle, and therefore care should be taken on attachment and detachment operation of the handset to and from the cradle, resulting in deterioration of operativity. Furthermore, in the case of being used during carrying, the former may require that the attachment and detachment operation of the handset is made upwardly and downwardly with respect to the cradle, and, particularly, it is required to draw the arm of the user for the detachment of the handset, resulting in deterioration of the operativity. On the other hand, the latter may require that the attachment and detachment operation of the handset to and from the cradle is made forwardly and backwardly. In this case, the transceiver unit may be held by the other hand, similarly resulting in deterioration of operativity. In addition, in the above-described arrangements, because of vertical installation, the installed place is limited to the seat of the motor vehicle and the inside of the trunk thereof and this feels inconvenience. Furthermore, the above-mentioned mobile radio telephones are not arranged so as to be used with being hung on the wall and therefore, when used after taken out from the motor vehicle, it is impossible to hang it on the wall in the building or yacht. This is inconvenience if there is no space on the table. If the telephone is used in a yacht, for example, there is the possibility that it is damaged due to dropping resulting from the pitch and roll.

Furthermore, the above-mentioned telephones have an arrangement in which a hinge mechanism is used for piling up the battery holding device and the transceiver unit, and therefore while the transceiver unit is attached to the battery holding device, the connectors thereof are coupled to each other in the rotation direction and may be overweighted and damaged.

SUMMARY OF THE INVENTION

The present invention has been developed in order to remove the disadvantages inherent to the conventional mobile radio telephones.

It is therefore an object of the present invention to provide a mobile radio telephone which can be stably put on a seat of a motor vehicle and a table and so on to improve the operativity, which is capable of making easy the attachment and detachment operation of the handset to and from the cradle and which is not limited to the seat of the motor vehicle and is allowed to be put freely, for example, below the seat and below the dashboard thereof. In addition, the mobile radio telephone according to the present invention can be used with it being hung on a wall in a building, yacht or the like while carried so that facility is improved and can be prevented from damage due to dropping.

In accordance with the present invention, there is provided a portable type mobile radio telephone comprising: a transceiver unit with a flat configuration; battery holding means for holding a battery which is placed on one wider surface of said transceiver unit; and a cradle for holding a handset which is formed on the one wider surface of said transceiver unit to be in parallel to said battery holding means, said cradle having engaging means engaged with said handset.

In accordance with the present invention, there is also provided a portable type mobile radio telephone comprising: a transceiver unit; a battery; a cradle; a handset supported in said cradle; projection means arranged to be mounted on a wall; and a mounting plate attached to said transceiver unit so as to cover one surface of said transceiver unit, said mounting plate having at least one pair of holes, each of said pair of holes being arranged to be engaged with said projection means so that said mobile radio telephone is supported by said pair of holes.

In accordance with the present invention, there is further provided a portable type mobile radio telephone comprising: a transceiver unit with a flat configuration, said transceiver unit having a guide hole and a first connector at one end narrower surface; battery holding means mounted on a wider surface of said transceiver unit; a cradle mounted on the wider surface of said transceiver unit to be arranged in parallel to said battery holding means; and a base plate attached to said battery holding means and said cradle so as to be interposed between said battery holding means and said cradle, and said transceiver unit, said base plate having a curved portion at one end portion thereof such that said curved portion facing the one narrower surface of said transceiver unit, said curved portion having a guide pin and a second connector so that said first and second connectors are guided by connection of said guide pin and said guide hole and coupled with each other when said base plate is moved in a parallel direction with respect to the wider surface of said transceiver unit.

Preferably, said transceiver unit has an engaging projection on the wider surface thereof and said base plate has an engaging hole which is positioned to face said engaging projection when said first and second connectors are coupled with each other. Said engaging projection has a shaft portion and a larger diameter cap portion mounted on one end portion of said shaft portion and said engaging hole has a larger diameter portion and a groove portion communicated with said larger diameter portion. Said larger diameter portion allows insertion of said larger diameter cap portion and said groove portion allows insertion of said shaft portion. Said mobile radio telephone further comprises an engaging means placed in the opposite side to said engaging projection with respect to said base plate, said engaging means including an engaging member placed on said engaging hole, said engaging member being resiliently deformable so as to allow insertion of said engaging projection into said engaging hole, said engaging member being arranged so as to lock said engaging projection when said engaging projection is guided along said groove portion of said engaging hole.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
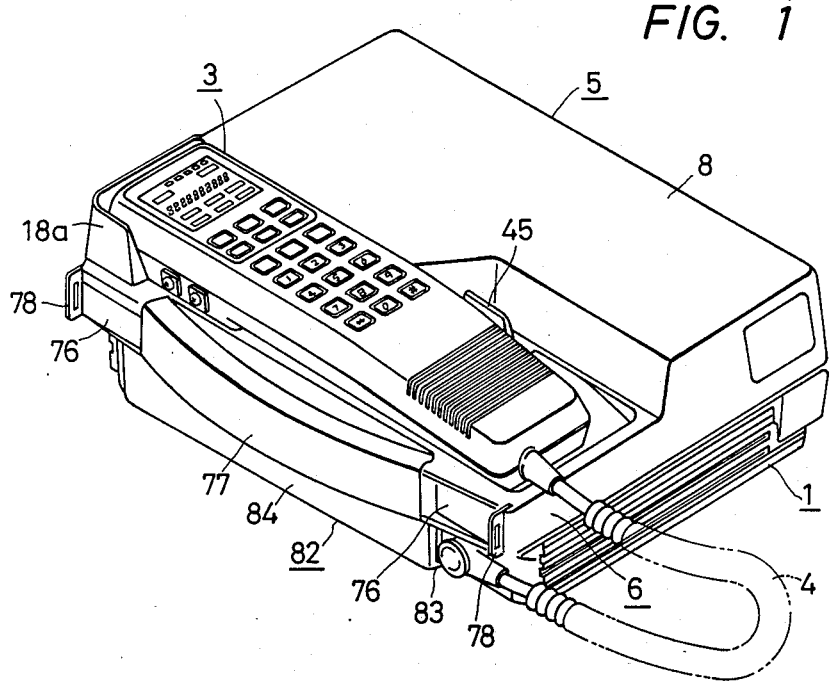
FIG. 1 is a perspective view of a mobile radio telephone according to an embodiment of the present invention which is laid.

Referring now to FIGS. 1 to 19B, there is illustrated a mobile radio telephone according to a first embodiment of the present invention which is shown as comprising a transceiver unit 1 having a flat configuration and arranged to be connected to an antenna 2 and a cord 3 of a handset 3 with functions for transmission and reception such as pushbuttons. A battery holding device 5 and a cradle 6 are installed on one flat surface of the transceiver unit 1, the battery holding device 5 and a rack frame 7 of the cradle 6 being made of a synthetic resin and integrally formed with each other. As particularly clear from FIG. 4, a frame 8 of the battery holding device 5 and the rack frame 7 of the cradle 6 are also integrally formed with each other, and the frame 8, rack frame 7 and a base plate 9 forms a casing. The frame 8 is integrally provided with a partition 10 placed between the frame 8 and the rack frame 7, and the battery holding device 5 is made up of the partition 10, the frame 8 and the base plate 9. As shown in FIG. 2, at one surface of the battery holding device 5 are formed an entrance 11 for insertion of a battery 13 and a connecting portion 12 of a cigarette lighter cable 14. The battery 13 is inserted from the inserting entrance 11 into the battery holding device 5 where it is held and the cigarette lighter cable 14 is connected to the connection portion 12. The battery 13, as obvious from FIG. 4, is protected by a shock-absorbing member 15 placed at the circumference of the battery 13 and within the battery holding device 5.

Figure 5:
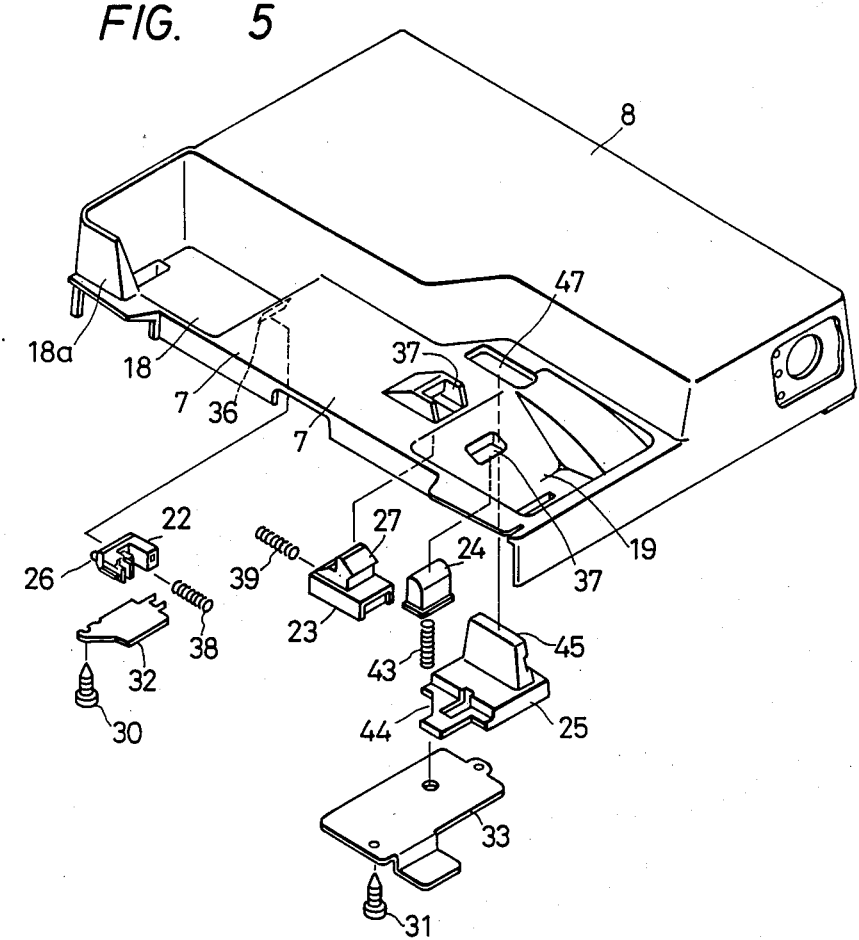
FIG. 5 is an exploded and perspective view of the mobile radio telephone.
Figure 6:
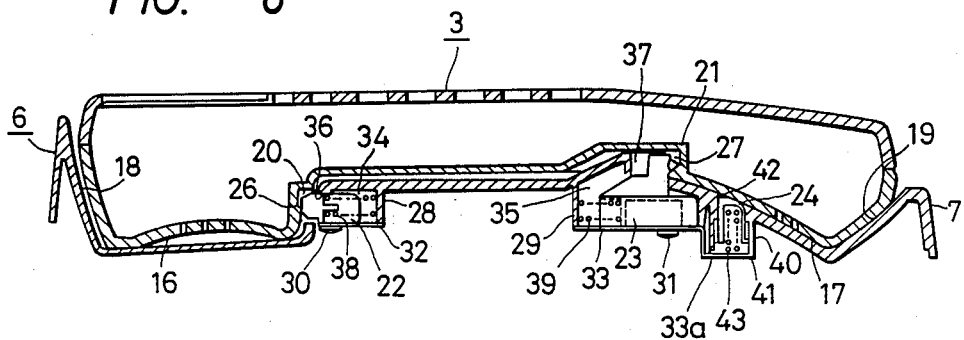
FIG. 6 is a cross-sectional view of a handset and a cradle.
Figure 7:
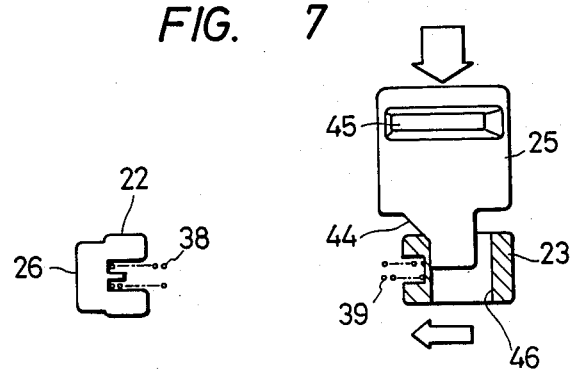
FIG. 7 is an illustration for describing the relation of an engaging member and a releasing lever.

A description of the cradle 6 will be made hereinbelow. Particularly as shown in FIGS. 5 and 6, at both ends of the rack frame 7 positioned along a longer side of the battery holding device 5 are formed recess portions 18 and 19 for a transmitter 16 and a receiver 17 of the handset 3 where a guard portion 18a with L-shaped cross section is provided which is connected to the battery holding device 5. On the rack frame 7 are provided engaging members 22, 23 which are engageble with engaging portions 20, 21 formed in opposed relation to each other on the transmitter 16 and the receiver 17, a member 24 for pushing up the handset 3, a releasing lever 25 for releasing the engaging member 23, and so on. The respective engaging members 22, 23 have engaging portions 26, 27 which respectively converged toward ends. On the rack frame 7 are defined chambers 34, 35 which are formed by frames 28, 29 integrally coupled to the rack frame 7 and plates 32, 33 attached to the rack frame 7 by means of screws 30, 31. These chambers 34, 35 have holes 36, 37 facing the recess portions 18, 19 where the engaging members 22, 23 are detachably supported by the holes 36, 37. Between the bottom walls of the chambers 34, 35 and the engaging members 22, 23 are interposed compression springs 38, 39, whereby the engaging portions 26, 27 of the respective engaging members 22, 23 are biased to be projected from the holes 36, 37. A frame 40 integrally attached to the rack frame 7 and a protruding portion 33a of the plate 33 form a chamber 41 which has a hole 42 opened to the recess portion 19. In the chamber 41, the pushing-up member 24 is detachably supported by the hole 42. Between the protruding portion 33a and the pushing-up member 24 is interposed a compression spring 43 whose resilient force causes the end portion of the pushing-up member 24 to be protruded through the hole 42 into the recess portion 19. The releasing lever 25 has an inclined surface 44 at its one end portion and has an operating portion 45 at the other end portion which is protrudingly provided. As shown in FIG. 7, the one end portion of the releasing lever 25 is inserted into a hole 46, defined in the engaging member 23, in the chamber 35 of the rack frame 7, and the operating portion 45 is protruded from a hole 47, defined in the rack frame 7, toward the outside and supported so as to be movable in directions normal to the moving directions of the engaging member 23. The releasing lever 25 is biased by the resilient force of the compression spring 39 so that the inclined surface 44 thereof is pressed by means of the wall of the hole 46 and is backed up with respect to the engaging member 23. When the releasing lever 25 is gone toward the engaging member 23 by means of operation of the operating portion 45, the wall of the hole 46 of the engaging member 23 is pressed by the inclined surface 44 thereof so that the engaging member 23 is backed up against the resilient force of the compression spring 39 to allow the engaging portion 27 to be inserted into the chamber 35. For supporting the handset 3 by the cradle 6, the transmitter 16 and the receiver 17 of the handset 3 are inserted into the recess portions 18, 19 of the cradle 6 and pressed whereby the transmitter 17 causes the pushing-up member 24 to be inserted into the chamber 41 against the resilient force of a compression spring 43, and the receiver 16 and the transmitter 17 cause the engaging portions 20, 21 to press the inclined portions of the engaging portions 26, 27 of the engaging members 22, 23 so that the engaging members 22, 23 are backed up against the resilient forces of the compression springs 38, 39. When the engaging portions 20, 21 exceed the engaging portions 26, 27, the engaging members 22, 23 are returned to its previous positions by means of the resilient forces of the compression springs 38, 39 and the engaging portions 26, 27 are respectively engaged with the engaging portions 20, 21. This prevents separation of the handset 3 due to vibration or the like. For removing the handset 3 from the cradle 6, the releasing lever 25 is pressed forwardly as described above so that the engaging member 23 is backed against the resilient force of the compression spring 39 and the engaging portion 27 is inserted into the chamber 35 to separate the engaging portion 27 from the engaging portion 21. Therefore, the transmitter 17 of the handset 3 is pressed upwardly by means of the protruding action of the pushing-up member 24 due to the resilient force of the compression spring 43, resulting in removal of the handset 3 from the recess portion 19. Thereafter, when the handset 3 is removed from the cradle 6, the inclined surface of the engaging portion 26 is pressed by the engaging portion 20 so that the engaging member 22 is backed against the resilient force of the compression spring 38 to release the engaging portion 20 from the engaging portion 26.

Figure 8:
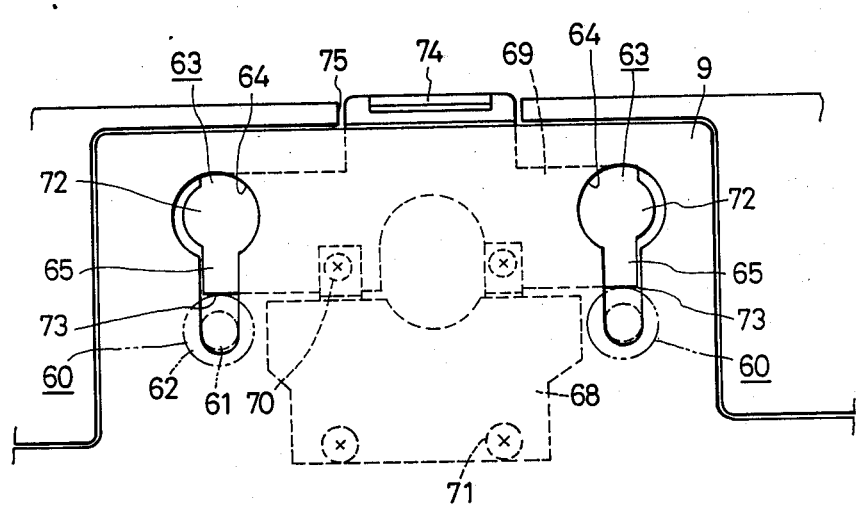
FIG. 8 is a bottom view of the handset cradle.
Figure 9:
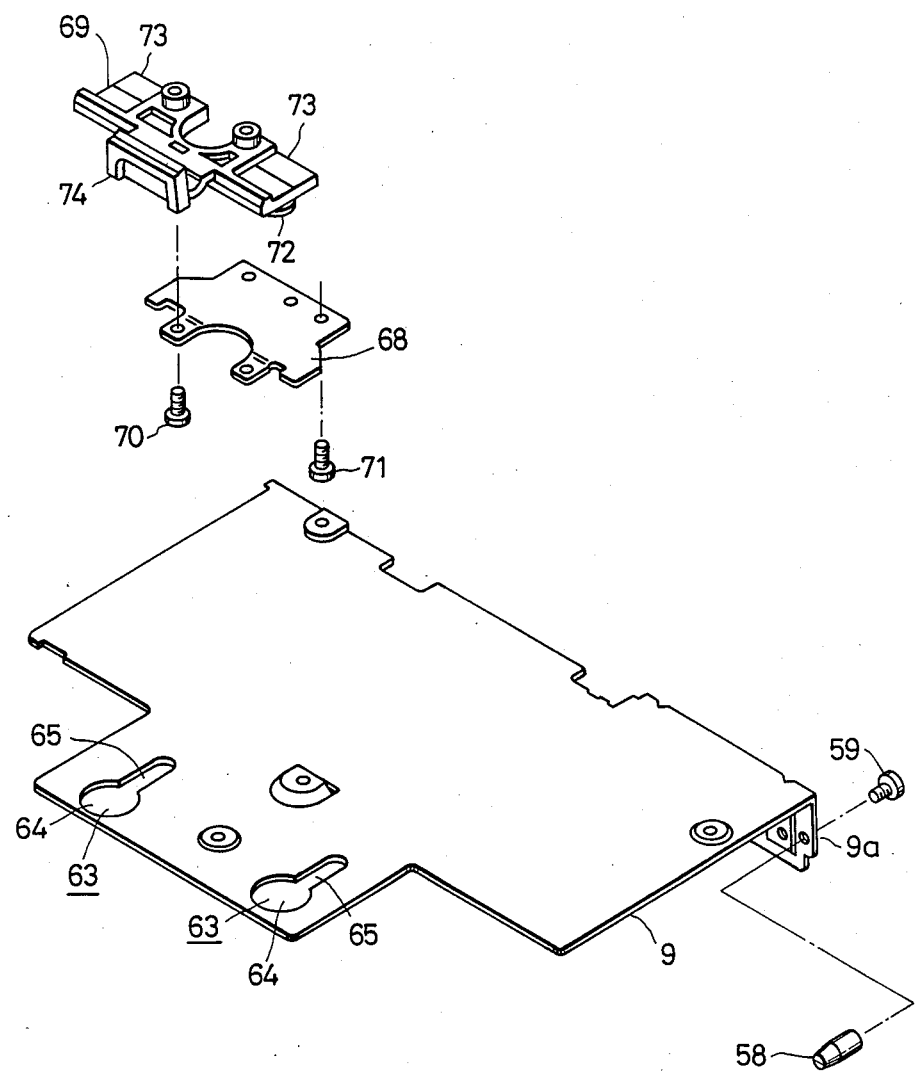
FIG. 9 is an exploded and perspective view of a mounting device for mounting a battery holding device and the cradle on a transceiver unit.

The battery holding device 5 and the cradle 6 are mounted on a flat surface of the transceiver unit 1. As shown in FIG. 4, on a curved portion 9a of the base plate 9 by means of a screw 51 is mounted a connector 50 coupled to the battery 13, and on a end plate of a casing 52 of the transceiver unit 1 by means of a screw 56 is mounted a connector 55 coupled to a printed circuit board 54 provided within the transceiver unit 1. A guide hole 57 is defined in the end plate 53 of the transceiver unit casing 52 in order for easy and sure connection of the connectors 50, 55, and on the other hand a guide pin 58 is mounted on the curved portion 9a of the base plate 9 by means of a screw 59. The guide pin 58 is protruded beyond the connector 50 and an end portion thereof is tapered for easy insertion into the guide hole 57. Two engaging projections 60 is provided on the upper flat surface of the transceiver unit casing 52 in the longitudinal direction thereof as shown in FIGS. 4, 8 and 9. Each of the engaging projections 60 has a engaging portion 62 which is placed at one end portion of a shaft portion 61 and which has larger in diameter as compared with the shaft portion 61. On the other hand, two engaging holes 63 are defined in the base plate 9 to face the two engaging projections 60. Each of the engaging holes 63 has a larger diameter portion 64 into which the engaging portion 62 of the engaging projection 60 can be inserted and an engaging groove portion 65 which has a relatively narrow width and into which the shaft portion 61 thereof can be inserted. A resiliently deformable engaging member 67 is mounted on a boss 66 which is integrally provided at the inside of the rack frame 7. The engaging member 67, in this embodiment, is made up of a leaf spring 68 made of metal and an operating member 69 made of synthetic resin, the base portion of the operating member 69 is connected to an end portion of the leaf spring 68 by means of a screw 70. The base portion of the leaf spring 68 is attached to the boss 66 by means of a screw 71 so that the operating member 67 is biased toward the base plate 9 side by means of the resilient force of the leaf spring 68. A protruding portion 72 provided on the operating member 67 closes the larger diameter portion 64 of the engaging hole 62. An engaging portion 73 is provided at the base portion of the operating member 69 and an operating portion 74 is formed at the end portion of the operating member 69. The operating portion 74 is slightly protruded with respect to a hole 75 defined in a side of the rack frame 7.

Figure 2:
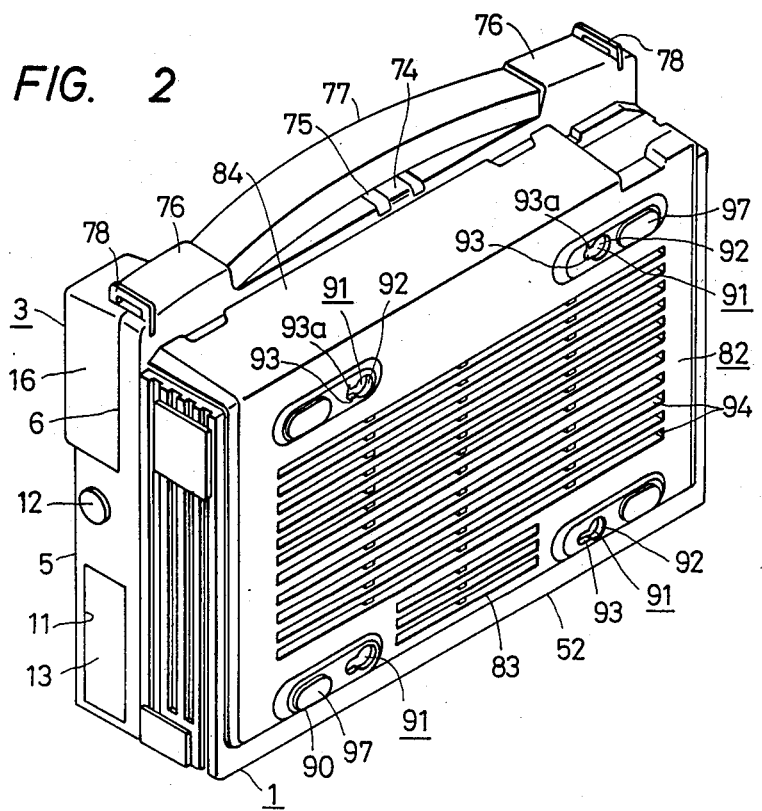
FIG. 2 is a perspective view of the mobile radio telephone which is stood.
Figure 3:
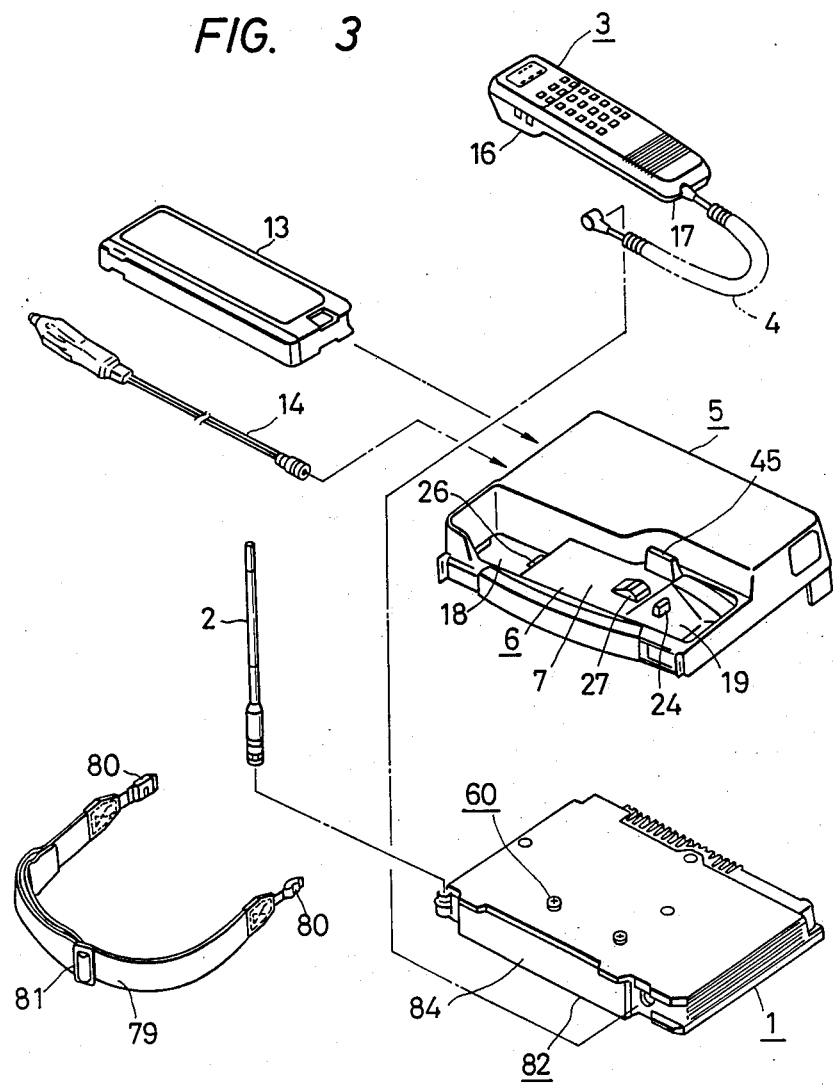
FIG. 3 is an exploded view of the mobile radio telephone.
Figure 4:
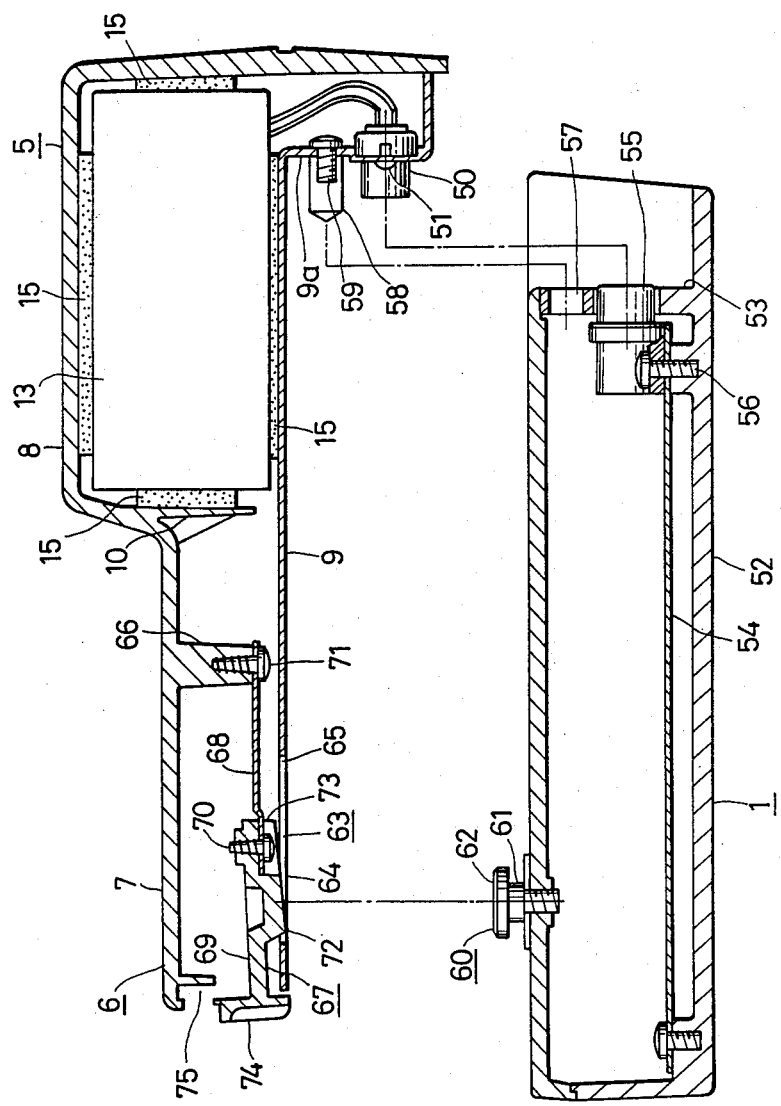
FIG. 4 is an exploded and cross-sectional view of the mobile radio telephone.

In FIGS. 1, 2 and 3, the reference numeral 77 represents a handle mounted on the cradle 6, numeral 79 designates a shoulder strap detachably attached to the cradle 6, numeral 82 represents a mounting plate which is made of a synthetic resin and which is mounted on the transceiver unit casing 52. As obvious from FIG. 11, a flat surface at the side opposite to battery holding device 5 and cradle 6 side, i.e., back plate 83 for covering the back surface, and an end surface 84 for covering the handle 77 side surface are connected at right angles to each other, and the back plate 83 has a screw hole 89, an engaging hole 91 and a number of radiating holes 94. The mounting plate 82 is mounted on the transceiver unit casing 52 through the hole 89 by means of a bush 95 and a screw 96. A member 97 is put into a recess portion 90 at the outside of the head portion of the screw 96.

Figure 10A:
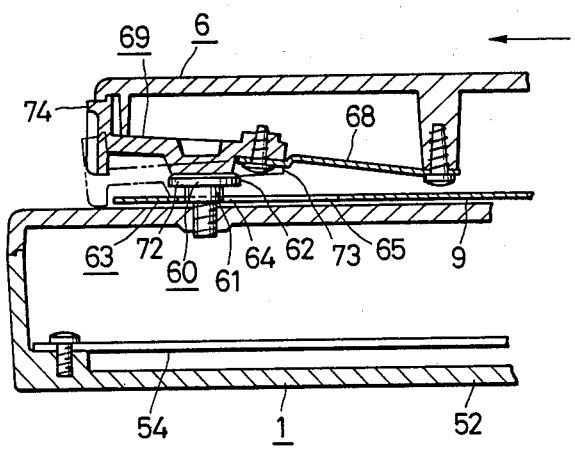
FIGS. 10A and 10B are illustrations for describing the mounting process of the battery holding device and the cradle on the transceiver unit.
Figure 10B:
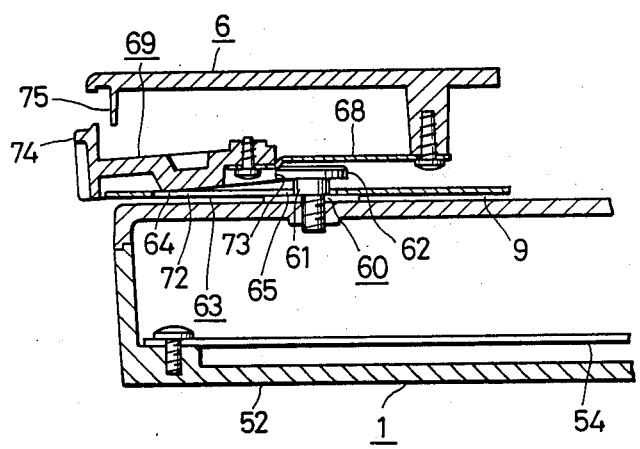

For mounting the battery holding device 5 and the cradle 6 on the transceiver unit casing 52, the end portion of the guide pin 58 is inserted into the guide hole 57 and the battery holding device 5 and the cradle 6 are then moved with respect to the transceiver unit casing 52 in the direction indicated by an arrow in FIG. 10A so that the guide pin 58 and the guide hole 57 act as a guide member to allow the connector 50 to be connected to the connector 55. On the other hand, when the battery holding device 5 and the cradle 6 are then moved downwardly, as shown in FIG. 10A, the engaging portion 62 of the engaging projection 60 causes the protruding portion 72 of the operating member 67 to be moved back (upwardly in illustration) against the resilient force of the leaf spring 68 and the engaging portion 62 and the shaft portion 61 of the engaging projection 60 are inserted into the larger diameter portion 64 of the engaging hole 63. Thereafter, in response to horizontal movement of the battery holding device 5 and the cradle 6 with respect to the transceiver unit 1, as shown in FIG. 10B, the shaft portion 61 of the engaging projection 60 is relatively moved along the engaging groove portion 65 of the engaging hole 63 so that the connectors 50, 55 are perfectly connected with each other. Concurrently with the perfect connection, the engaging projection 62 of the engaging projection 60 is separated from the operating member 69 and, since the operating member 69 is biased toward the base plate 9 side by means of the resilient force of the leaf spring 68, the engaging portion 73 is engaged with the engaging portion 62 of the engaging projection 60. At this time, the engaging projection 60 is supported by an edge portion of the engaging groove portion 65 of the engaging hole 63 whereby the movement thereof is limited, resulting in the locking state. On the other hand, if the operating member 69 is rotationally moved in the direction apart from the base plate 9 against the resilient force of the leaf spring 68, since the engaging portion 62 of the engaging projection 60 is released from the locking state, and therefore, in accordance with the reverse processes the battery holding device 5 and the cradle 6 can be removed from the transceiver unit casing 52. Using such a mounting device allows the battery holding device 5 and the cradle 6 to be mounted on the transceiver unit casing 52 in the parallel direction to the wider surface of the transceiver unit casing 52 and allows the connectors 50, 55 to be easily connected with each other without damage.

As shown in FIGS. 1, 2 and 3, the handle 77 and the shoulder strap 79 are provided as carrying means. That is, handle-mounting portions 76 are formed at the hole 75 side end surfaces of the cradle 6 such that the hole 75 is interposed therebetween. The handle 77 is attached to the mounting portions 76 by means of a known mechanism so that the hole 75 is covered by the handle 77, i.e., the operating portion 74 is covered, and the handle 77 is spread to be separated from the hole 75 or the operating portion 74. Furthermore, anchors 78 are mounted at the outer sides of the mounting portions 76 and, as shown in FIG. 3, connecting members 80 provided at both ends of the belt-like shoulder strap 79 are respectively detachably connected to the anchors 78 by means of a known mechanism. A known length adjusting member 81 is provided at the intermediate portion of the shoulder strap 79 to adjust the length of the shoulder strap 79.

Figure 16:
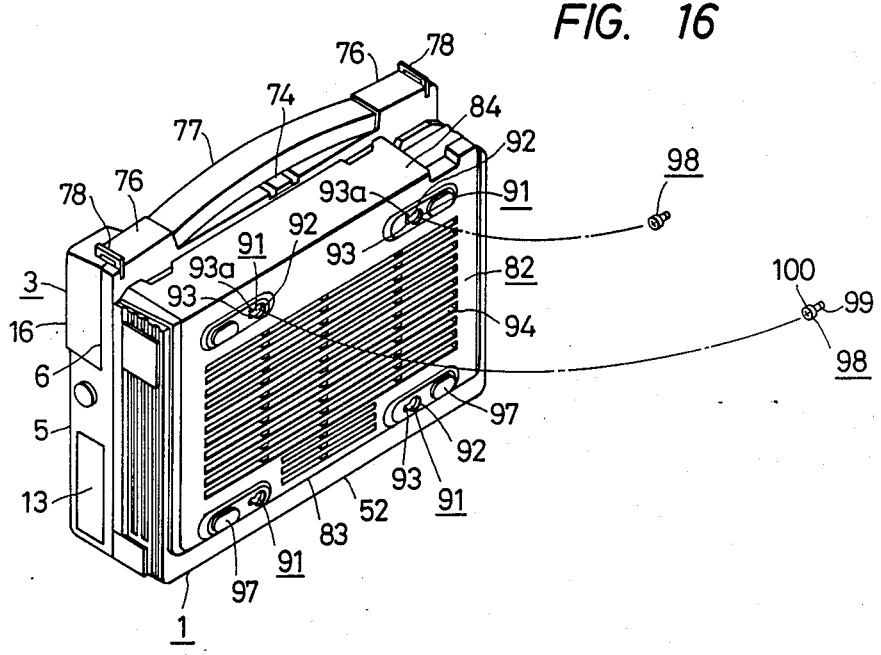
FIG. 16 is a perspective view of the mobile radio telephone for describing an arrangement for hang the mobile radio telephone on a wall.

The above-mentioned portable type mobile radio telephone has a flat configuration and this provides excellent stability on installation and convenience on carrying. Since the portable type mobile radio telephone is used in the state that it ids mounted on a wall, as shown in FIGS. 1, 2, 3 and 11, the transceiver unit 1 has the mounting plate 8 which acts as a back plate 83 attached to the transceiver unit casing 52. The mounting plate 82 is made of a synthetic resin and, particularly as obvious from FIGS. 2 and 11, the flat surface at the side opposite to the mounting side of the battery holding device 5 and the cradle 6, i.e., the back plate 83 for covering the back of the transceiver unit 1, is connected, at right angles to each other, to the plate 84 for covering the handle 77 side surface and one side of the plate 84 is cut off so as to interrupt the connection of the cord 4 of the handset 3. An elongated projecting portion 85 is integrally formed at the edges of the three sides of the inner surface of the back plate 84 other than plate 84 side, and bosses 86 and elongated circular projecting portions 87 are formed at the four corners of the back plate 84, and a plurality of elongated projections (in illustration, three projections) 88 are formed in parallel to the shorter sides of the back plate 84 at the middle portion of the inner surface of the back plate 84. These projections 85, bosses 86, projecting portions 87 and projections 88 are equal in height to each other. A screw hole 89 is defined in each of the bosses 86, and the shallow recess portion 90 is defined at the outer peripheral portion of the hole 89 and at the outer surface of the back plate 84. Each of the engaging holes 91 is formed at the inside of the projecting portion 87 and at four places of the back plate 83. Each of the engaging holes 91 positioned at the plate 85 side comprises a larger diameter portion 92, a narrow engaging groove portion 93 coupled to the larger diameter portion 92 and defined along the longer sides of the back plate 83, a narrow engaging groove portion 93a communicated with an end portion of the groove portion 93 at right angles thereto, i.e., formed to extend toward the plate 84. On the other hand, each of the engaging holes 91 positioned apart from the plate 84 comprises a larger diameter portion 92 and a narrow groove portion 93 coupled to the larger diameter portion 92 and defined along the longer sides of the back plate 93. All the engaging holes 91 are arranged so that the larger diameter portion 92 sides face the recess portion 19 of the cradle 6 for the transmitter 17 when the plate 82 is mounted on the transceiver unit casing 52. The back plate 83 has a number of radiating holes formed in the directions normal to the direction of the projections 88. The mounting plate 82 is attached through the holes 89 to the transceiver unit casing 52 by means of the bushs 95 and the screws 96 so that the end surfaces of the projections 85, bosses 86, projecting portions 87 and projections 88 are brought into contact with the transceiver unit casing 52. The screen members 97 are inserted under pressure from the outsides of the screws 96 into the recess portions 90. For mounting this portable type mobile radio telephone on a wall, the mounting plate 82 and further engaging projections 98 as shown in FIG. 16 is used. Each of the engaging projections 98 is arranged to be inserted into the engaging groove portion 93 of the engaging hole 91 and is integrally provided with an engaging portion 100 and a threaded shaft portion 99, the engaging portion 100 being allowed to be inserted into the larger diameter portion 92 of the engaging hole 91. Although in the illustration one engaging hole 91 is provided at each of the corners, it is also appropriate that a plurality of engaging holes are defined at each of the sides thereof.

Since the transceiver unit 1 generates heat during speaking or waiting and the transceiver unit casing 52 is made of a metal for ensuring the shield functions, the transceiver unit casing 52 is heated. However, the mounting plate 82 is made of a synthetic resin and has the number of radiating holes 94, and therefore it provides insulating functions.

Figure 12:
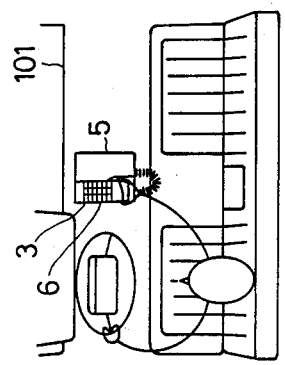
FIGS. 12 to 14 are illustrations for describing the mounting of the mobile radio telephone on a motor vehicle.
Figure 13:
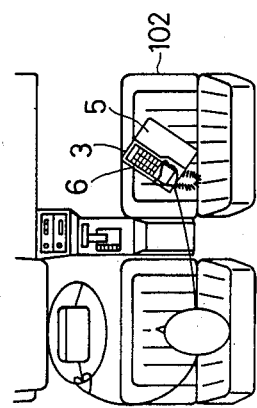
Figure 11:
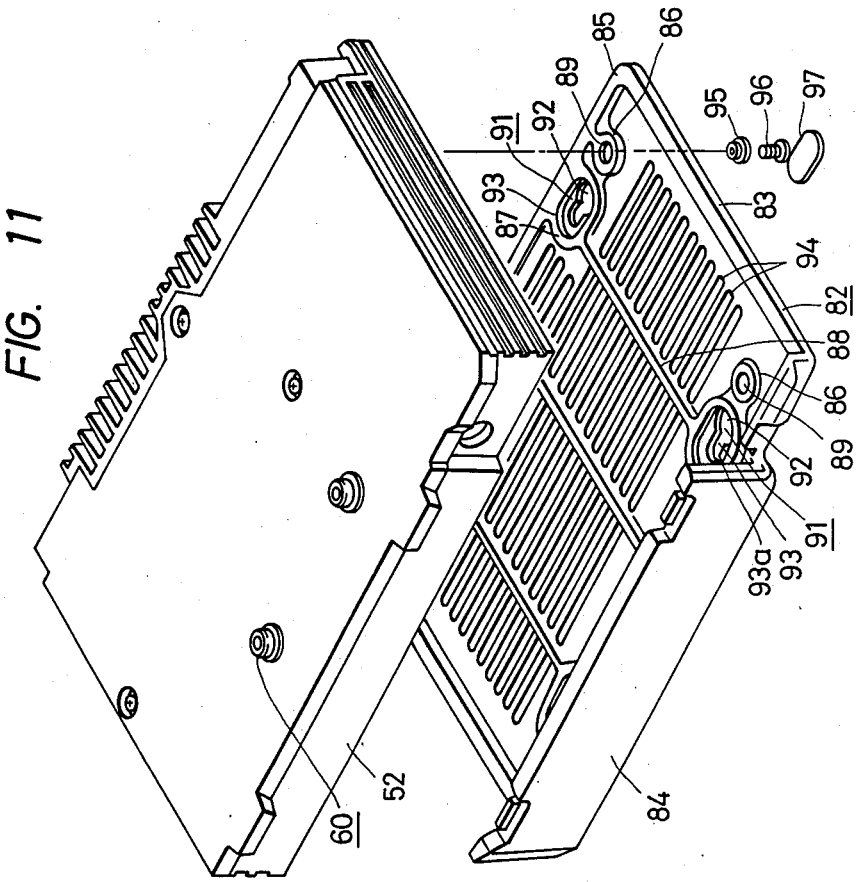
FIG. 11 is a partially exploded view of the transceiver unit.
Figure 14:
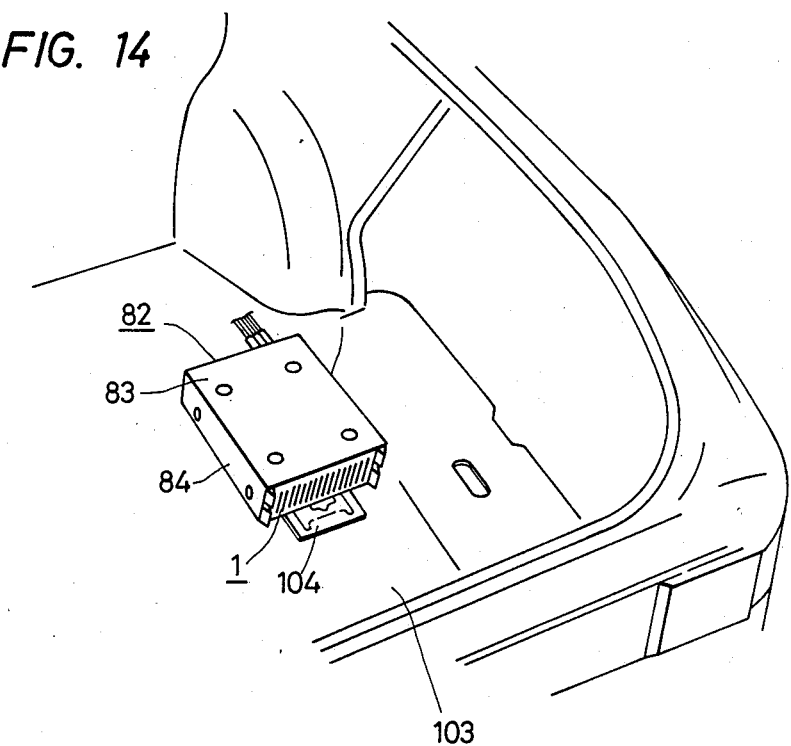

A description will be made hereinbelow in terms of use of the portable type mobile radio telephone according to the embodiment. As shown in FIGS. 1 and 2, the battery holding device 5 and the cradle 6 are attached to the transceiver unit 1 and the handset 3 is supported by the cradle 6. In the case that the radio telephone is used in a motor vehicle, the radio telephone is placed such that, as shown in FIG. 12, the back plate 83 of the mounting plate 82 faces downwardly and the telephone is supported by a universal mounting device (not shown) on a floor of the motor vehicle. Furthermore, as shown in FIG. 13, it is possible to place it on a seat 102 thereof such that the back plate 83 of the mounting plate 82 faces downwardly. In this case, the mounting plate 82 can protect the seat 102 from heat of the transceiver unit 1. Furthermore, as shown in FIG. 14, it is possible that the transceiver unit 1 is installed on a floor 103 in the trunk by means of a mounting device 104 and the battery holding device 5, the cradle 6 and the handset 3 coupled to the transceiver unit 1 by means of a cable, not shown, are placed on the seat 102. In this case, if the transceiver unit 1 is placed such that the back plate 83 of the mounting plate 82 faces upwardly, it is possible to protect vinyl products such as golf bag encased in the trunk from heat of the transceiver unit 1. In addition, although not illustrated, it is also appropriate that the transceiver unit 1 is placed below the seat 102 and the battery holding device 5, cradle 6 and handset 3 coupled thereto are placed on the seat 102.

Figure 15:
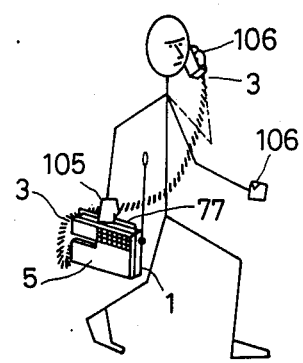
FIG. 15 is an illustration for describing the used state of the mobile radio telephone.
Figure 18:
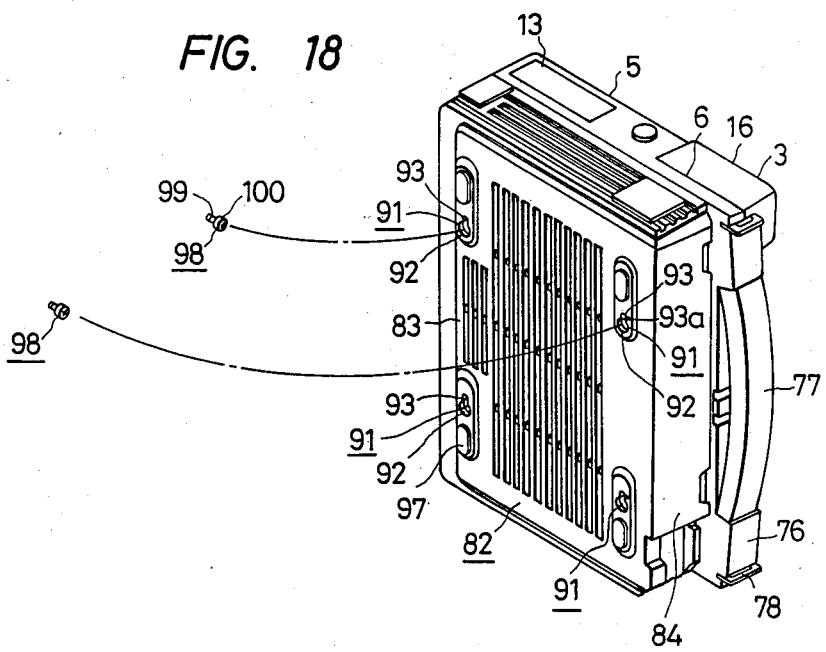
FIG. 18; is a perspective view of the mobile radio telephone.
Figures 17A, 17B:
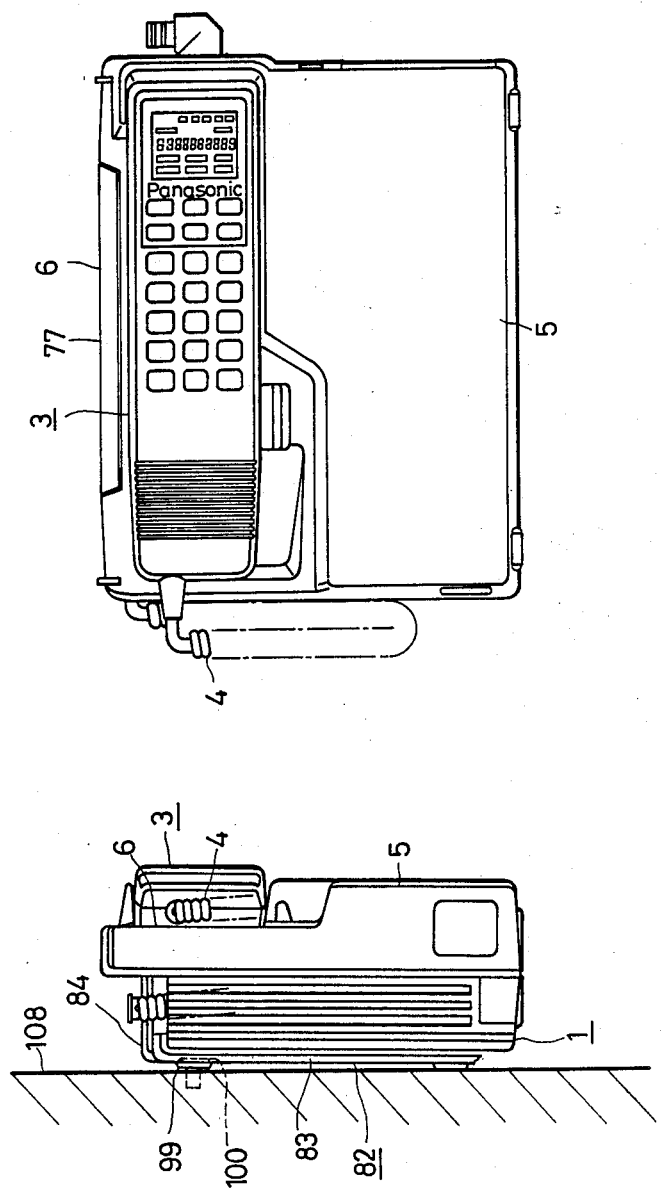
FIGS. 17A and 17B respectively show the state that the mobile radio telephone is hung on the wall.
Figure 19A:
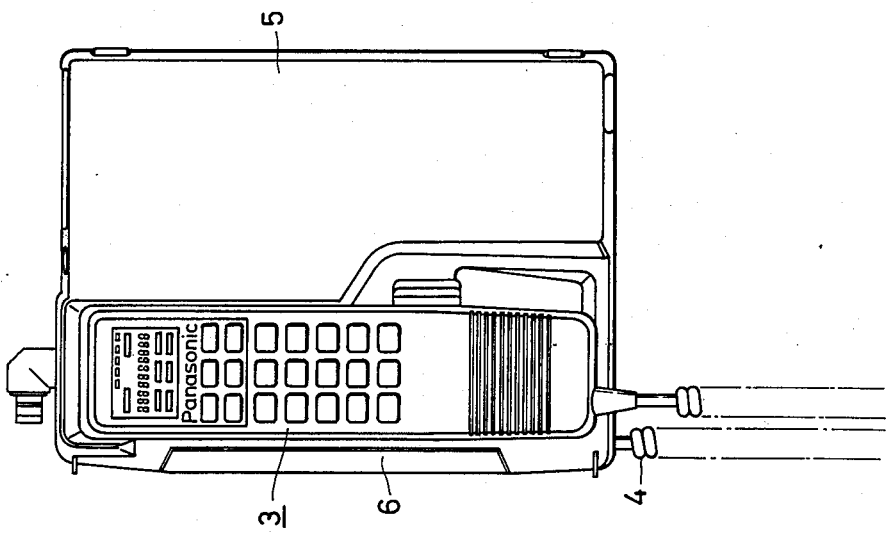
FIGS. 19A and 19B respectively show another state in which the mobile radio telephone is hung on the wall.
Figure 19B:
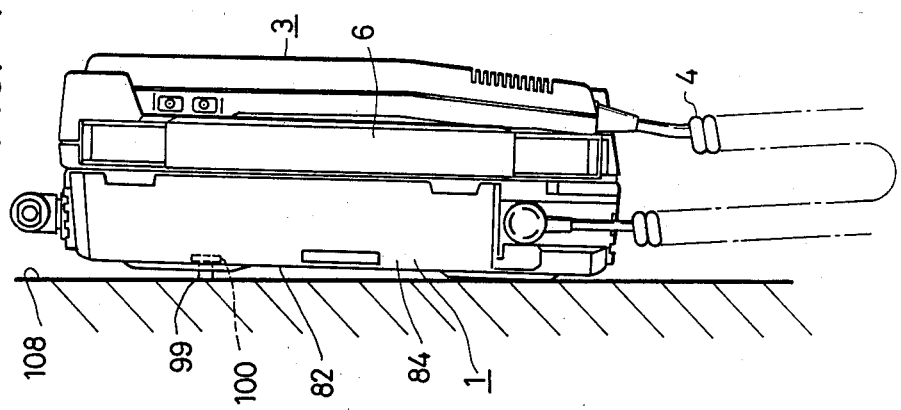

When the portable type mobile radio telephone is taken out from the motor vehicle, as shown in FIG. 15, the handle 77 is gripped by one hand 105 for carrying and the handset 3 is operated by the other hand 106. Furthermore, when the mobile radio telephone is taken into a building or a yacht, as shown in FIG. 17A, the engaging projections 98 of FIG. 16 is mounted on a wall 108. In the case that the handset 3 of the telephone is horizontally positioned at the upper side, each of the larger diameter portions 92 of the engaging holes 91 defined at the longer side of the mounting plate 82 is first inserted into each of the engaging portions 10 of the engaging projections 98 and the telephone is then moved slightly in the longitudinal direction so that each of the engaging groove portions 93 is engaged with each of the shaft portions 99 of the engaging projections 98. Thereafter, the telephone is moved downwardly so that each of the shaft portions 99 is inserted into each of the engaging groove portions 93a and the edge portion of the engaging groove portion 93a is engaged with each of the engaging portions 100 of the engaging projections 98, and as a result, the telephone can be used with it being hung on the wall as shown in FIGS. 17A and 17B. Furthermore, in the case that the telephone is vertically positioned at the left side as shown in FIG. 18, each of the engaging portions 100 of the engaging projections 98 is first inserted into each of the larger diameter portions 93 of the engaging holes 91 defined at the shorter sides of the mounting plate 82, and the telephone is then moved slightly downwardly so that the shaft portion 99 of the engaging projection 98 is inserted into the engaging groove 93 and the edge portion of the engaging groove portion 93 is engaged with the engaging portion 100 of the engaging projection 98, and as a result, the telephone can be used with it being hung on the wall 108 as shown in FIGS. 19A and 19B. As described above, if the telephone is used with it being hung on the wall 108, it is convenient when there is no space on a table and it is possible to prevent it from being damaged due to dropping irrespective of pitch and roll of the yacht. It is also appropriate that it is used on a table if there is a space therefor.

Although in the above-mentioned embodiment the cradle 6 is integrally formed with the battery holding device 5, it is also appropriate that a mounting rack for the cradle 6 is integrally formed with the battery holding device 5 and the cradle 6 is mounted on the mounting rack.

Figure 20:
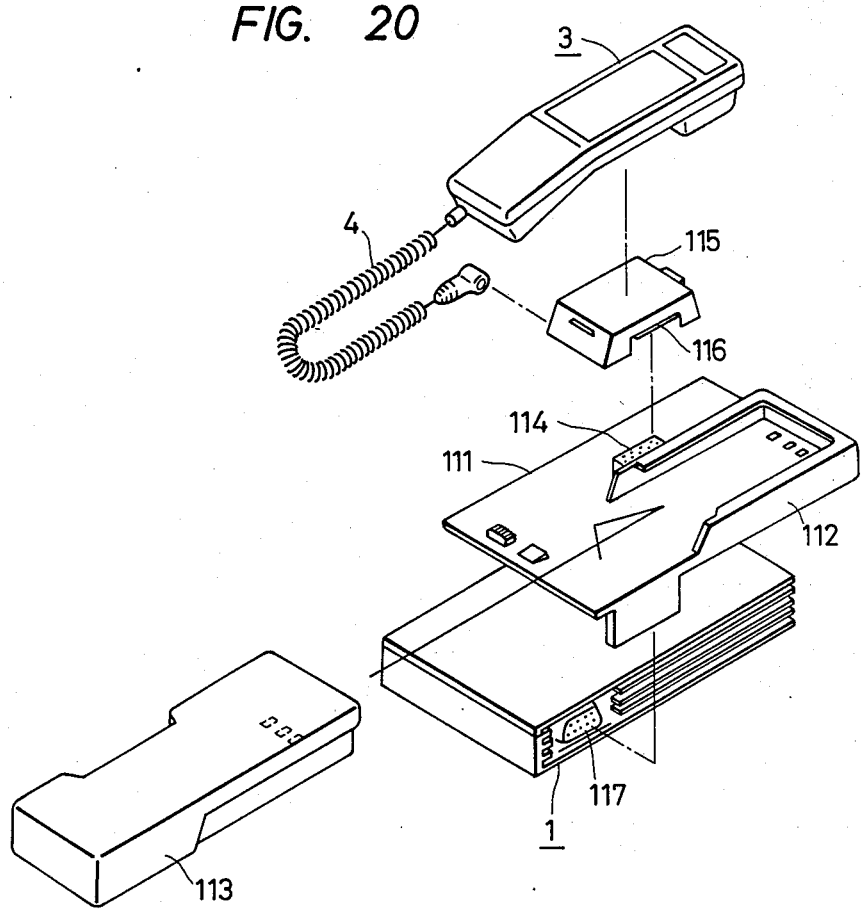
FIG. 20 is a schematically exploded view of a mobile radio telephone according to another embodiment of the present invention.

A portable type mobile radio telephone according to a second embodiment will be described hereinbelow. In this second embodiment, as schematically shown in FIG. 20, a battery holding device 112 (frame) is integrally with a mounting rack 111. A battery 113 is held by the battery holding device 112 and a connector 114 of the mounting rack 111 is coupled to a connector 116 of a cradle 115 and a cord 4 of a handset 3 is connected to the cradle 115 and further a connector (not shown) of the mounting rack 111 is connected to a connector 117 of a transceiver unit 1. The arrangement of the telephone in FIG. 22 is similar to that of the telephone according to the first embodiment.

According to the present invention, the battery holding device and the cradle are placed in parallel on the transceiver unit with a flat configuration. A battery is held in the battery holding device and the handset is supported by the cradle so that the handset is equal in height to the battery. The other flat surface of the transceiver unit opposite to the surface on which the handset and the battery are placed can be installed on a seat of a motor vehicle and a table, and further, since the height of the mobile radio telephone is low relatively, stability can be improved, resulting in easy attachment and detachment of the handset. Furthermore, the mobile radio telephone can be carried with the flat surface of the transceiver unit in opposite to the battery and handset side facing the human body, and this makes it possible to remove the handset in the horizontal direction and attach it to the cradle in the horizontal direction, resulting in free movement of the arm. In addition, since the pressing force generated during the attachment is received by the human body, the handset can be operated by only one hand, resulting in improvement of operativity. Furthermore, since the height of the telephone is low, the installation place can be freely selected without being limited to the seat, under-seat, under dashboard of a motor vehicle. Furthermore, the mobile radio telephone can be used with it being hung on a wall, and therefore the mobile radio telephone does not become obstructive. In the case that it is used in a yacht or the like which is swinging, it is possible to prevent it from being damaged due to dropping. In addition, since the battery holding device 5, cradle 6 and transceiver unit can be attached horizontally to each other, the connectors are not damaged and can be easily coupled to each other.

It should be understood that the foregoing relates to only embodiments of the present invention, and that it is intended to cover all changes and modifications of the embodiments of this invention herein used for the purposes of the disclosure, which do not constitute departures from the spirit and scope of the invention.

What is claimed is:

1. A portable type mobile radio telephone comprising:
   a transceiver unit with a flat configuration;
   battery holding means for holding a battery which is placed on one wider surface of said transceiver unit;
   a cradle for holding a handset, said cradle formed on the one wider surface of said transceiver unit in parallel to said battery holding means, said cradle having engaging means engaged with said handset, and the upper surface of said handset being substantially equal in height to the upper surface of said battery holding means when said handset is engaged with said cradle; and
   a rack frame which is integrally formed with said battery holding means.

2. A portable type mobile radio telephone comprising:
   a transceiver unit with a flat configuration;
   battery holding means for holding a battery which is placed on one wider surface of said transceiver unit; and
   a cradle for holding a handset which is formed on the one wider surface of said transceiver unit to be in parallel to said battery holding means, said cradle having engaging means engaged with said handset;
   said cradle mounted on a mounting rack which is integrally formed with said battery holding means.

3. A portable type mobile radio telephone as claimed in claim 3, further comprising:
   projection means arranged to be mounted on a wall; and
   a mounting plate attached to said transceiver unit, said mounting plate having at least one pair of holes, each of said pair of holes being arranged to be engaged with said projection means so that said mobile radio telephone is supported by said pair of holes.

4. A portable type mobile radio telephone as claimed in claim 3, wherein each of said pair of holes comprising a larger diameter portion, a first groove portion coupled to said larger diameter portion and a second groove portion coupled to said first groove portion and extending at substantially right angles to said first groove portion, said projection means having a shaft portion and an engaging portion with a diameter greater than that of said shaft portion, said engaging portion being mounted on one end of said shaft portion, the diameter of said engaging portion being smaller than a diameter of said larger diameter portion of said holes and the diameter of said shaft portion being smaller that a diameter of said first and second groove portions whereby said projection means is inserted into said larger diameter portion and guided through said first groove portion to said second groove means where it is supported.

5. A portable type mobile radio telephone comprising:
- a transceiver unit with a flat configuration and an insulating plate at the outside thereof, which is made of a synthetic resin;
- battery holding means for holding a battery which is placed on one wider surface of said transceiver unit; and
- a cradle for holding a handset which is formed on the one wider surface of said transceiver unit to be in parallel to said battery holding means, said cradle having engaging means engaged with said handset.

6. A portable type mobile radio telephone as claimed in claim 5, wherein said insulating plate has a plurality of projecting portions which are brought into contact with said transceiver unit and said insulating plate further has a number of radiating holes.

7. A portable type mobile radio telephone comprising:
- a transceiver unit with a flat configuration; said transceiver unit having a guide hole and a first connector at one end narrower surface;
- battery holding means mounted on a wider surface of said transceiver unit;
- a cradle mounted on the wider surface of said transceiver unit to be arranged in parallel to said battery holding means; and
- a base plate attached to said battery holding means and said cradle so as to be interposed between said battery holding means and said cradle, and said transceiver unit, said base plate having a curved portion facing the one narrower surface of said transceiver unit, said curved portion having a guide pin and a second connector so that said first and second connectors are guided by connection of said guide pin and said guide hole and coupled with each other when said base plate is moved in a parallel direction with respect to the wider surface of said transceiver unit on which said battery holding means is mounted.

8. A portable type mobile radio telephone as claimed in claim 7, wherein said transceiver unit has an engaging projection on the wider surface thereof on which said battery holding means is mounted, and said base plate having an engaging hole which is positioned to face said engaging projection when said first and second connectors are coupled to each other, said engaging projection having a shaft portion and a larger diameter cap portion mounted on one end portion of said shaft portion and said engaging hole having a larger diameter portion and a groove portion communicated with said larger diameter portion, said larger diameter portion allowing insertion of said larger diameter cap portion and said groove portion allowing insertion of said shaft portion, and said mobile radio telephone further comprising an engaging means placed in the opposite side to said engaging projection with respect to said base plate, said engaging means including an engaging member placed on said engaging hole, said engaging member being resiliently deformable so as to allow insertion of said engaging projection into said engaging hole, said engaging member being arranged so as to lock said engaging projection when said engaging projection is guided along said groove portion of said engaging hole.

9. A portable type mobile radio telephone as claimed in claim 3, wherein said mounting plate has first, second and third holes, said first and second holes being used when said mobile radio telephone is vertically mounted on said wall and said second and third holes being used when said mobile radio telephone is horizontally mounted on said wall.

* * * * *